United States Patent
Nishikawa et al.

(10) Patent No.: US 9,857,782 B2
(45) Date of Patent: Jan. 2, 2018

(54) OUTPUT VALUE CORRECTION METHOD FOR PHYSICAL QUANTITY SENSOR APPARATUS, OUTPUT CORRECTION METHOD FOR PHYSICAL QUANTITY SENSOR, PHYSICAL QUANTITY SENSOR APPARATUS AND OUTPUT VALUE CORRECTION APPARATUS FOR PHYSICAL QUANTITY SENSOR

(71) Applicant: FUJI ELECTRIC CO., LTD., Kawasaki-shi (JP)

(72) Inventors: Mutsuo Nishikawa, Matsumoto (JP); Kazunori Saito, Matsumoto (JP); Katsuyuki Uematsu, Hata-machi (JP); Kazuhiro Matsunami, Matsumoto (JP); Keiichi Ito, Matsumoto (JP)

(73) Assignee: FUJI ELECTRIC CO., LTD., Kawasaki-shi, Kanagawa (JP)

(*) Notice: Subject to any disclaimer, the term of this patent is extended or adjusted under 35 U.S.C. 154(b) by 578 days.

(21) Appl. No.: 14/358,573

(22) PCT Filed: Dec. 28, 2012

(86) PCT No.: PCT/JP2012/084242
§ 371 (c)(1),
(2) Date: May 15, 2014

(87) PCT Pub. No.: WO2013/100156
PCT Pub. Date: Jul. 4, 2013

(65) Prior Publication Data
US 2014/0358317 A1   Dec. 4, 2014

(30) Foreign Application Priority Data
Dec. 28, 2011 (JP) ................... 2011-289981

(51) Int. Cl.
*G05B 15/02* (2006.01)
*G01D 3/036* (2006.01)

(52) U.S. Cl.
CPC ........... *G05B 15/02* (2013.01); *G01D 3/0365* (2013.01)

(58) Field of Classification Search
None
See application file for complete search history.

(56) References Cited

U.S. PATENT DOCUMENTS 5,848,383 A    12/1998 Yunus
7,881,830 B2*  2/2011 Yasui ................ F01N 9/00
                                                 700/28

FOREIGN PATENT DOCUMENTS

CN   101936791 A   1/2011
CN   102032974 A   4/2011
(Continued)

OTHER PUBLICATIONS

China Patent Office, "Office Action for CN 201280056285.X" dated Jul. 23, 2015.
(Continued)

*Primary Examiner* — Umut Onat
(74) *Attorney, Agent, or Firm* — Manabu Kanesaka

(57) ABSTRACT

A first acquiring unit acquires initial output values of a physical quantity sensor. A second acquiring unit acquires target output values for the physical quantity sensor. A first calculating unit extracts first characteristic values by calculating a second-order first characteristics formula which indicates corrected output characteristics of the physical quantity sensor, based on the initial output values and target output values of the physical quantity sensor. The second calculating unit extracts second characteristic values by calculating a second-order second characteristics formula for correcting the first characteristic values, based on a (Continued)

predetermined temperature and the first characteristic values. A computing unit computes a corrected output value for the physical quantity sensor based on the first characteristics formula which is corrected by inputting the second characteristic values to the second characteristics formula.

15 Claims, 8 Drawing Sheets

(56)  References Cited

FOREIGN PATENT DOCUMENTS

| | | |
|---|---|---|
| GB | 2098744 A | 11/1982 |
| JP | H02-047690 B2 | 10/1990 |
| JP | H06-265424 A | 9/1994 |
| JP | H06-294664 A | 10/1994 |
| JP | H10-281806 A | 10/1998 |
| JP | H10-339673 A | 12/1998 |
| JP | 2001-527648 A | 12/2001 |
| JP | 2009-260626 A | 11/2009 |
| JP | 2010-281581 A | 12/2010 |

OTHER PUBLICATIONS

Japan Patent Office, "Office Action for JP 2013-551873," dated Apr. 7, 2015.
PCT, "International Search Report for International Application No. PCT/JP2012/084242".

\* cited by examiner

Fig. 6

| TERM IN APPROXIMATION FORMULA | PARAMETER | VALUE IN EMBODIMENT | MEANING OF PARAMETER |
|---|---|---|---|
| $K_2(\Delta T)$ | $kT_{22}$ | $1.5 \times 10^{-5}$ | CURVE COMPONENT OF SENSITIVITY CURVE (NON-LINEARITY OF SENSITIVITY) W.R.T. TEMPERATURE |
| | $kT_{21}$ | $-3.9 \times 10^{-3}$ | GRADIENT OF SENSITIVY CURVE (NON-LINEARITY OF SENSITIVITY) W.R.T. TEMPERATURE |
| | $kT_{20}$ | $-1.2$ | SENSITIVITY CURVE (NON-LINEARITY OF SENSITIVITY) AT REFERENCE TEMPERATURE |
| $K_1(\Delta T)$ | $kT_{12}$ | $-7.8 \times 10^{-6}$ | CURVE COMPONENT OF SENSITIVITY AMPLIFICATION RATIO W.R.T. TEMPERATURE |
| | $kT_{11}$ | $2.6 \times 10^{-2}$ | GRADIENT OF SENSITIVITY AMPLIFICATION RATIO W.R.T. TEMPERATURE |
| | $kT_{10}$ | $1.3 \times 10$ | SENSITIVITY AMPLIFICATION RATIO AT REFERENCE TEMPERATURE |
| $K_0(\Delta T)$ | $kT_{02}$ | $2.4 \times 10^{-6}$ | CURVE COMPONENT OF OFFSET W.R.T. TEMPERATURE |
| | $kT_{01}$ | $1.1 \times 10^{-4}$ | GRADIENT OF OFFSET W.R.T. TEMPERATURE |
| | $kT_{00}$ | $-1.1 \times 10^{-1}$ | OFFSET CORRECTION AMOUNT AT REFERENCE TEMPERATURE |

OUTPUT VALUE CORRECTION METHOD FOR PHYSICAL QUANTITY SENSOR APPARATUS, OUTPUT CORRECTION METHOD FOR PHYSICAL QUANTITY SENSOR, PHYSICAL QUANTITY SENSOR APPARATUS AND OUTPUT VALUE CORRECTION APPARATUS FOR PHYSICAL QUANTITY SENSOR

RELATED APPLICATIONS

The present application is National Phase of International Application No. PCT/JP2012/084242 filed Dec. 28, 2012, and claims priority from Japanese Application No. 2011-289981 filed Dec. 28, 2011.

TECHNICAL FIELD

The present invention relates to an output value correction method for a physical quantity sensor apparatus, an output value correction method for a physical quantity sensor, a physical quantity sensor apparatus and an output value correction apparatus for a physical quantity sensor.

BACKGROUND ART

Conventionally known physical quantity sensor apparatuses are, for example, a physical quantity sensor apparatus which corrects the output characteristics of a physical quantity sensor element, by converting an analog signal output from the physical quantity sensor element to a digital signal by an A/D converter (ADC: Analog-to-Digital Converter) and carrying out computational processing using a computation circuit such as a CPU (Central Processing Unit) and a DSP (Digital Signal Processor).

An apparatus that has been proposed as a physical quantity sensor apparatus of this kind is one provided with: an analog input unit which converts an analog input signal input from a control object, into a digital signal and outputs the digital signal; a temperature detector which detects an ambient temperature at the periphery of the apparatus; a temperature correction table which is created on the basis of actual measurement of the error between the digital value of the digital signal and the expected value of an analog input signal, under different temperature conditions and stores correction data in which the ambient temperature and a correction value are associated on a one-to-one basis; and temperature correction means for reading a correction value corresponding to the temperature detected by the temperature detector and correcting the digital value read from the analog input circuit by this correction value to obtain final digital data (see, for example, Patent Document 1 below).

Furthermore, in another proposed apparatus, an analog signal from a semiconductor pressure converter which changes in accordance with a measured pressure is converted into sequential digital uncompensated pressure data by a first A/D converter, in addition to which an analog signal which changes in accordance with the measured temperature output from a temperature sensing element is converted into sequential digital uncompensated temperature data by a second A/D converter, and when this respective data is supplied to a computing apparatus, the computing apparatus reads out, from a storage unit, temperature data for compensation at least two reference temperatures in an operating pressure range and temperature range stored in the storage unit, and pressure data for compensation at least two reference pressures at each reference temperature stored in the storage unit (see, for example, Patent Document 2 below).

Moreover, another proposed apparatus is provided with: a pressure sensor circuit which generates a voltage level detection signal corresponding to a detected pressure; a temperature detection circuit which generates a temperature signal having a voltage level corresponding to the temperature of the pressure sensor circuit; a reference voltage generating circuit which generates a reference signal having a uniform voltage level, regardless of the detected pressure and temperature of the pressure sensor circuit; an A/D converter circuit for converting the detection signal, the temperature signal and the reference signal into digital data; an analog multiplexer which selectively passes the detection signal, the temperature signal and the reference signal and supplies same as a conversion object signal to the A/D conversion circuit; and signal processing means for calculating an applied pressure P by carrying out a computing process $P=\{(T/A-b)\times(-e/a)+D/A-f\}/\{(T/A-b)\times c/a+d\}$, when the applied pressure at the pressure sensor circuit is P, the digital data converted by the A/D converter circuit respectively from the detection signal, the temperature signal and the reference signal are pressure information D, temperature information T and reference information A, the temperature coefficient of the sensitivity of the pressure sensor circuit is c, the room temperature sensitivity of the pressure sensor circuit is d, the temperature coefficient of the offset of the pressure detection value is e, the room temperature offset value of the pressure detection value is f, the temperature coefficient of the temperature detection value is a, and the room temperature offset value of the temperature detection value is b; wherein the analog multiplexer is composed so as to pass the reference signal and the temperature signal prior to the detection signal, and the signal processing means carries out a computing process based on the reference information A and the temperature information T corresponding to the reference signal and the temperature signal, and then carries out a computing process based on the results of this computing process and the pressure information D corresponding to the detection signal, thereby calculating the applied pressure P (see, for example, Patent Document 3 below).

Patent Document 1: Japanese Patent Application Publication No. 2009-260626
Patent Document 2: Japanese Patent Application Publication No. H6-265424
Patent Document 3: Japanese Patent Application Publication No. H10-339673

DISCLOSURE OF THE INVENTION

However, in the technology described in Patent Document 1 above, correction amounts for correcting an output value of an electrical signal generated at an arbitrary detection point of a physical quantity sensor element are respectively stored in a storage unit in the form of a data table, for respective specific detection ranges, as a correction amount for correcting the output value of the electrical signal generated within a particular specific detection range. Therefore, the output values of the electrical signal generated in a particular detection range of the physical quantity sensor element are all corrected by a uniform correction amount, and hence there is a problem in that the correction accuracy declines.

It is possible to improve correction accuracy by narrowing each of the specific detection ranges which are corrected by a uniform correction amount, but the volume of correction amount data increases, and a new problem arises in that an expensive storage unit having a large data capacity must be used. Furthermore, in the technology described in Patent Document 1 above, in order to store correction amount data in advance in a storage unit in the form of a data table, the electrical signal must be measured at a large number of detection points within the potential detection range of the physical quantity sensor element. Consequently, there is a problem in that the measurement costs increase.

Furthermore, in the technology described in Patent Document 2 above, correction amount data is stored previously in a storage unit in the form of a data table, and a correction amount for correcting the output value of an electrical signal generated at a detection point for which correction amount data has not been stored in the data table is calculated by interpolation. Therefore, although the volume of correction amount data does not increase, in addition to the computing process for correcting the output value of the electrical signal, it is also necessary to carry out a computing process for calculating the correction amount by interpolation. Therefore, problems arise in that the computing circuitry becomes large in scale, the computing process time becomes greater, and it is difficult to achieve high-speed operation.

On the other hand, in the technology described Patent Document 3 above, the output characteristics of a physical quantity sensor element are corrected by carrying out a computing process using a computing circuit which has been composed on the basis of a calculation formula that reflects the output characteristics of the physical quantity sensor element. Since a computing process for calculating the correction amount is not carried out, then the scale of the computing circuitry can be reduced. Furthermore, the storage unit needs to only store the coefficients and constants of the abovementioned calculation formula, and therefore it is possible to use an inexpensive storage unit having a small data capacity.

Nevertheless, in general, the output of a physical quantity sensor element has a curve component which changes in the form of a second-order curve with respect to the pressure and temperature. In the technology described in Patent Document 3 above, correction is only possible in respect of a first-order component which changes linearly in direct proportion to the pressure and temperature, and therefore it is difficult to achieve higher correction accuracy. Furthermore, since the outputs of the other constituent elements, such as the A/D converter, which make up the physical quantity sensor apparatus, also have second-order components, then depending on the compositional conditions of the physical quantity sensor apparatus, it is necessary to correct third and fourth-order components which change in the form of a third or fourth-order curve with respect to the pressure or temperature.

This invention has been devised in order to resolve the abovementioned problems relating to the prior art, an object thereof being to provide an output value correction method for a physical quantity sensor apparatus, an output value correction method for a physical quantity sensor, a physical quantity sensor apparatus, and an output value correction apparatus for a physical quantity sensor, having high correction accuracy. Furthermore, in order to resolve the abovementioned problems relating to the prior art, it is an object of the present invention to provide an output value correction method for a physical quantity sensor apparatus, an output value correction method for a physical quantity sensor, a physical quantity sensor apparatus, and an output value correction apparatus for a physical quantity sensor, whereby costs can be reduced. Moreover, in order to resolve the abovementioned problems relating to the prior art, it is an object of the present invention to provide an output value correction method for a physical quantity sensor apparatus, an output value correction method for a physical quantity sensor, a physical quantity sensor apparatus and an output value correction apparatus for a physical quantity sensor, whereby processing speed can be accelerated.

In order to resolve the abovementioned problems and achieve the objects of the present invention, the output value correction method of the physical quantity sensor apparatus relating to this invention is an output value correction method for a physical quantity sensor apparatus that includes: a physical quantity sensor detecting a physical quantity, other than temperature, which is dependent on temperature and outputting an electrical signal in accordance with the detected physical quantity; and a temperature sensor outputting an electrical signal corresponding to the detected temperature, wherein the method has the following characterizing features. A first acquiring step is carried out to respectively acquire at least three initial output values output by the physical quantity sensor at least three predetermined temperatures. A second acquiring step is carried out to respectively acquire target output values for the physical quantity sensor previously established in accordance with the at least three initial output values. A first calculating step is carried out to calculate first characteristic values for correcting output characteristics of the physical quantity sensor changing non-linearly with respect to the detected physical quantity, based on the initial output values and the target output values. A second calculating step is carried out to calculate second characteristic values for correcting the first characteristic values changing non-linearly with respect to the temperature detected by the temperature sensor, based on the predetermined temperature and the first characteristic values.

Furthermore, the output value correction method for a physical quantity sensor apparatus according to the present invention is the invention described above, wherein in the first calculating step, a first characteristics formula indicating corrected output characteristics of the physical quantity sensor is calculated by approximating the initial output values and the target output values to a second-order or higher-order polynomial expression for each of the predetermined temperatures, and coefficients and constant terms of the first characteristics formula are set as the first characteristic values.

Moreover, the output value correction method for a physical quantity sensor apparatus according to the present invention is the invention described above, wherein in the second calculating step, a second characteristics formula indicating temperature dependence characteristics of the first characteristic values is calculated by approximating the predetermined temperature and the first characteristic values to a second-order or higher-order polynomial expression for each of the coefficients and constant terms of the first characteristics formula, and coefficients and constant terms of the second characteristics formula are set as the second characteristic values.

Furthermore, the output value correction method for a physical quantity sensor apparatus according to the present invention is the invention described above, wherein a least-square method is used when approximating to the second-order or higher-order polynomial expression.

Moreover, the output value correction method for a physical quantity sensor apparatus according to the present invention is the invention described above, further including a computing step of computing a corrected output value for the physical quantity sensor, based on an output value of the physical quantity sensor at a current time, and the corrected first characteristic values which have been corrected by using an output value of the temperature sensor at the current time and the second characteristic values.

Furthermore, the output value correction method for a physical quantity sensor apparatus according to the present invention is the invention described above, further including a computing step of computing a corrected output value for the physical quantity sensor, by inputting an output value of the physical quantity sensor at a current time, an output value of the temperature sensor at the current time, and the second characteristic values, into computing means which constitutes the first characteristics formula and the second characteristics formula.

Moreover, the output value correction method for a physical quantity sensor apparatus according to the present invention is the invention described above, wherein in the computing step, a corrected output value for the physical quantity sensor proportional to a power supply voltage is computed.

Furthermore, the output value correction method for a physical quantity sensor apparatus according to the present invention is the invention described above, further including a storing step of storing the second characteristic values in storing means, wherein in the computing step, the second characteristic values which have been read out from the storing means are used.

Moreover, the output value correction method for a physical quantity sensor apparatus according to the present invention is the invention described above, wherein the physical quantity sensor is a pressure sensor, an acceleration sensor, a gyro sensor, or a flow rate sensor.

Furthermore, in order to solved the aforementioned problems and achieve the objects of the present invention, the physical quantity sensor apparatus relating to the present invention includes: a physical quantity sensor detecting a physical quantity, other than temperature, which is dependent on temperature and outputs an electrical signal in accordance with the detected physical quantity. The physical quantity sensor apparatus also includes: a temperature sensor outputting an electrical signal corresponding to the detected temperature; and first acquiring means for respectively acquiring at least three initial output values output by the physical quantity sensor at at least three predetermined temperatures. The physical quantity sensor apparatus also includes second acquiring means for respectively acquiring target output values for the physical quantity sensor previously set in accordance with the at least three initial output values. The physical quantity sensor apparatus also includes first calculating means for calculating first characteristic values for correcting output characteristics of the physical quantity sensor changing non-linearly with respect to the detected physical quantity, based on the initial output values and the target output values. The physical quantity sensor apparatus also includes second calculating means for calculating second characteristic values for correcting the first characteristic values changing non-linearly with respect to the temperature detected by the temperature sensor, based on the predetermined temperature and the first characteristic values.

Moreover, the physical quantity sensor apparatus according to the present invention is the invention described above, wherein the first calculating means calculates a first characteristics formula indicating corrected output characteristics of the physical quantity sensor by approximating the initial output values and the target output values to a second-order or higher-order polynomial expression, for each of the predetermined temperatures, and sets coefficients and constant terms of the first characteristics formula as the first characteristic values.

Furthermore, the physical quantity sensor apparatus according to the present invention is the invention described above, wherein the second calculating means calculates a second characteristics formula indicating temperature dependence characteristics of the first characteristic values by approximating the predetermined temperature and the first characteristic values to a second-order or higher-order polynomial expression, for each of the coefficients and constant terms of the first characteristics formula, and sets coefficients and constant terms of the second characteristics formula as the second characteristic values.

Moreover, the physical quantity sensor apparatus according to the present invention is the invention described above, wherein a least-square method is used when approximating to the second-order or higher-order polynomial expression.

Furthermore, the physical quantity sensor apparatus according to the present invention is the invention described above, further including computing means for computing a corrected output value for the physical quantity sensor, based on an output value of the physical quantity sensor at a current time, and the corrected first characteristic values which have been corrected by using an output value of the temperature sensor at the current time and the second characteristic values.

Moreover, the physical quantity sensor apparatus according to the present invention is the invention described above, further including computing means which constitutes the first characteristics formula and the second characteristics formula, wherein the computing means computes a corrected output value for the physical quantity sensor by receiving an output value of the physical quantity sensor at a current time, an output value of the temperature sensor at the current time, and the second characteristic values.

Furthermore, the physical quantity sensor apparatus according to the present invention is the invention described above, wherein the computing means computes a corrected output value for the physical quantity sensor proportional to a power supply voltage.

Moreover, the physical quantity sensor apparatus according to the present invention is the invention described above, further including storing means for storing the second characteristic values, wherein the computing means uses the second characteristic values which have been read out from the storing means.

Furthermore, the physical quantity sensor apparatus according to the present invention is the invention described above, wherein the physical quantity sensor is a pressure sensor, an acceleration sensor, a gyro sensor, or a flow rate sensor.

Moreover, in order to solve the aforementioned problems and achieve the objects of the present invention, the output value correction method for a physical quantity sensor according to the present invention is an output value correction method for a physical quantity sensor, which detects a physical quantity, other than temperature dependent on temperature and which outputs an electrical signal in accordance with the detected physical quantity, the method correcting an output value of the physical quantity sensor by acquiring an output signal from the physical quantity sensor and an output signal from a temperature sensor which outputs an electrical signal corresponding to the detected temperature, wherein the method has the following characterizing features. A first acquiring step is carried out to respectively acquire at least three initial output values output by the physical quantity sensor at at least three predetermined temperatures. A second acquiring step is carried out to respectively acquire target output values for the physical quantity sensor previously established in accordance with the at least three initial output values. A first calculating step is carried out to calculate first characteristic values for correcting the output characteristics of the physical quantity sensor changing non-linearly with respect to the detected physical quantity, based on the initial output values and the target output values. A second calculating step is carried out to calculate second characteristic values for correcting the first characteristic values changing non-linearly with respect to the temperature detected by the temperature sensor, based on the predetermined temperature and the first characteristic values.

Furthermore, in order to solve the aforementioned problems and achieve the objects of the present invention, the output value correction apparatus for a physical quantity sensor according to the present invention is an output value correction apparatus for a physical quantity sensor detecting a physical quantity other than temperature that is dependent on temperature and which outputs an electrical signal in accordance with the detected physical quantity, the output value correction apparatus correcting an output value of the physical quantity sensor by receiving an output signal from the physical quantity sensor and an output signal from a temperature sensor which outputs an electrical signal corresponding to the detected temperature, wherein the output value correction apparatus has the following characterizing features. The output value correction apparatus includes first acquiring means for respectively acquiring at least three initial output values output by the physical quantity sensor at at least three predetermined temperatures. The output value correction apparatus also includes second acquiring means for respectively acquiring target output values for the physical quantity sensor previously set in accordance with the at least three initial output values. The output value correction apparatus also includes first calculating means for calculating first characteristic values for correcting output characteristics of the physical quantity sensor changing non-linearly with respect to the detected physical quantity, based on the initial output values and the target output values. The output value correction apparatus also includes second calculating means for calculating second characteristic values for correcting the first characteristic values changing non-linearly with respect to the temperature detected by the temperature sensor, based on the predetermined temperature and the first characteristic values.

According to the invention described above, even if there is curve in the initial output characteristics of a physical quantity sensor and a temperature sensor, it is possible to compute an output value of the physical quantity sensor in which these curves have been corrected. Furthermore, according to the invention described above, since a minimum of nine correction parameters need to be stored in the storing means, it is possible to use an inexpensive storing means having a small data capacity. Furthermore, even if the number of orders of the first and second characteristics formulas is increased, the number of correction parameters stored in the storing means does not rise greatly. Consequently, even if an inexpensive storing means having a small data capacity is used, the correction parameters can be increased by calculating third-order or fourth-order first and second characteristics formulas, and curves caused by peripheral equipment can be corrected readily.

Furthermore, according to the invention described above, it is possible to compute a corrected output value for the physical quantity sensor, by one transfer function which includes a first characteristics formula indicating corrected output characteristics of the physical quantity sensor and a second characteristics formula indicating the coefficients and constant terms of the first characteristics formula. Therefore, regardless of the number of orders of the transfer function, it is possible to compute a corrected output value for the physical quantity sensor by using a computing circuit which constitutes the aforementioned transfer function, simply by basic circuits, such as a such as OR circuits or AND circuits, and the like.

Moreover, according to the invention described above, in order to calculate a correction parameter for correcting the output characteristics of the physical quantity sensor, initial output values of the physical quantity sensor need to be acquired at a minimum of nine measurement points (namely, three physical quantities are measured at each one of three predetermined temperatures). Therefore, it is possible to reduce the work required to make initial settings in the physical quantity sensor apparatus. Furthermore, by increasing the number of measurement points, for instance, by measuring four physical quantities at each one of four predetermined temperatures, then the approximation accuracy for calculating the first and second characteristics formulas is improved.

According to the output value correction method for a physical quantity sensor apparatus, the output value correction method for a physical quantity sensor, the physical quantity sensor apparatus and the output value correction apparatus for a physical quantity sensor of the present invention, a beneficial effect is obtained in that correction accuracy can be improved. Furthermore, according to the output value correction method for a physical quantity sensor apparatus, the output value correction method for a physical quantity sensor, the physical quantity sensor apparatus and the output value correction apparatus for a physical quantity sensor of the present invention, a beneficial effect is obtained in that costs can be reduced. Moreover, according to the output value correction method for a physical quantity sensor apparatus, the output value correction method for a physical quantity sensor, the physical quantity sensor apparatus and the output value correction apparatus for a physical quantity sensor of the present invention, a beneficial effect is obtained in that the processing speed can be accelerated.

BRIEF DESCRIPTION OF THE DRAWINGS

FIG. 6 is an illustrative diagram showing details of the temperature characteristics of the physical quantity sensor apparatus according to an embodiment of the present invention.

BEST MODE FOR CARRYING OUT THE INVENTION

Figure 1:
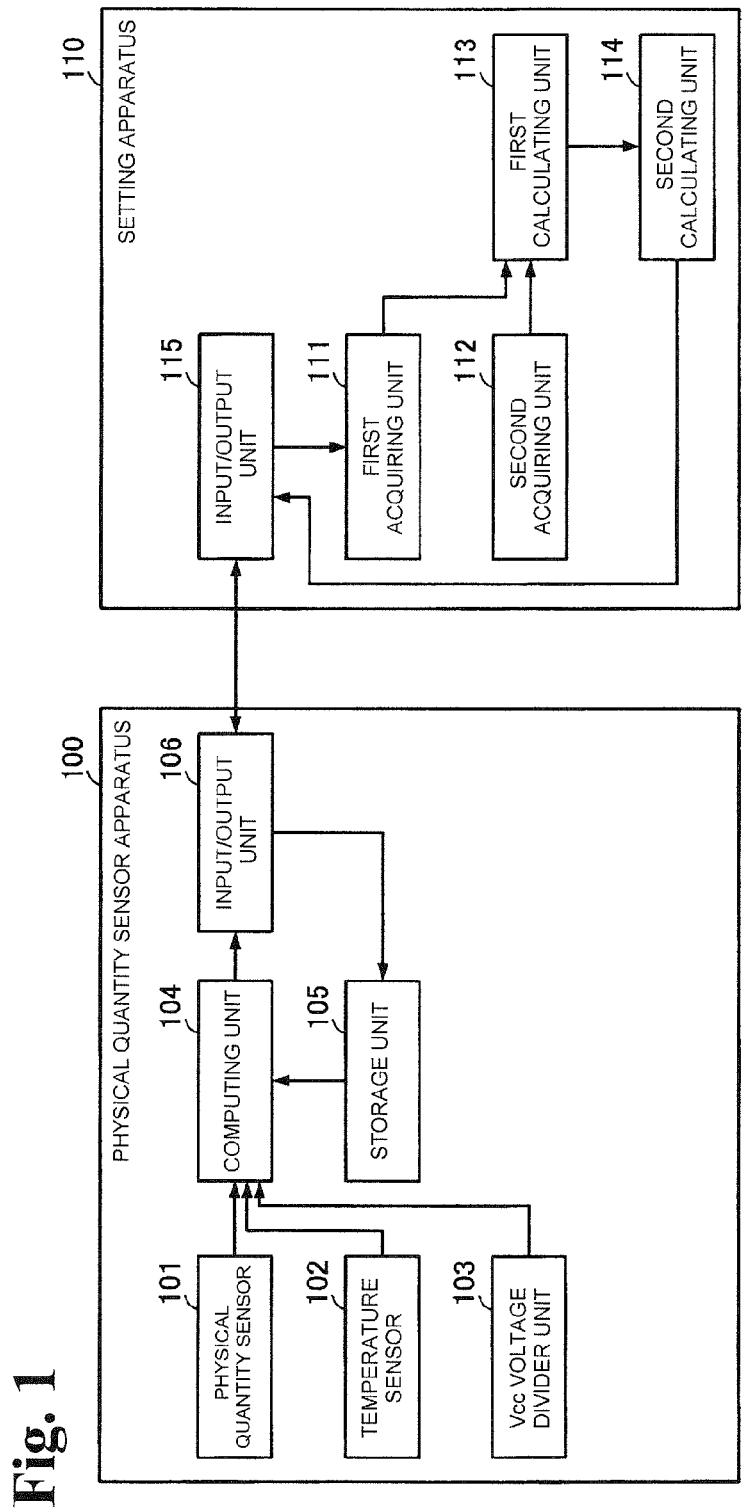
FIG. 1 is a block diagram showing a functional composition of a physical quantity sensor apparatus according to an embodiment of the present invention.

A preferred embodiment of an output value correction method for a physical quantity sensor apparatus, an output value correction method for a physical quantity sensor, a physical quantity sensor apparatus and an output value correction apparatus for a physical quantity sensor relating to the present invention are described in detail below with reference to the accompanying drawings. In the description and accompanying drawings of the embodiment described below, the same constituent parts are labeled with the same reference numerals and duplicated description is omitted.

Embodiments

FIG. 1 is a block diagram showing the functional composition of a physical quantity sensor apparatus relating to an embodiment of the present invention. The physical quantity sensor apparatus 100 shown in FIG. 1 corrects the output value of the physical quantity sensor 101, to a desired output value, and outputs the value externally. The "desired output value" means, for example, the output value of the physical quantity sensor apparatus 100 during actual use or in a pre-shipment test, based on output characteristics previously established on the basis of the design specifications of the physical quantity sensor apparatus 100. The physical quantity sensor apparatus 100 is constituted by a physical quantity sensor 101, a temperature sensor 102, a Vcc voltage divider unit 103, a computing unit 104, a storage unit 105, and an input/output unit 106. The physical quantity sensor apparatus 100 acquires initial settings information for the physical quantity sensor apparatus 100 which has been calculated by a setting apparatus 110.

The "initial setting information" is information calculated by the setting apparatus 110. This initial setting information may include only second characteristic values, of first and second characteristic values calculated by the setting apparatus 110. The first characteristic values are information for correcting the output characteristics of the physical quantity sensor 101 which change non-linearly with respect to the detected physical quantity, and are coefficients and constant terms of a first characteristics formula which indicates output characteristics of the physical quantity sensor 101 after correction. The second characteristic values are information for correcting the first characteristic values which change non-linearly with respect to the temperature detected by the temperature sensor 102, and are coefficients and constant terms of a second characteristics formula which indicates the temperature dependence of the first characteristic values.

Furthermore, the physical quantity sensor apparatus 100 also has operating modes 1 to 3. The operating mode 1 is an operating mode before initial settings in which initial settings information for the physical quantity sensor apparatus 100 is stored in the storage unit 105. The operating mode 2 is an operating mode in which initial settings information is written to the storage unit 105. The operating mode 3 is an operating mode after the initial settings information has been written to the storage unit 105 (after initial setting), for example, an operating mode during actual use or pre-shipment testing of the physical quantity sensor apparatus 100. The operating modes 1 to 3 of the physical quantity sensor apparatus 100 may be controlled via a program by a control unit (not illustrated), or may be controlled mechanically or artificially by a switch which is turned on and off mechanically.

The physical quantity sensor 101 is a sensor element which generates an output signal in accordance with a detected physical quantity of a medium that under measurement. The physical quantity detected by the physical quantity sensor 101 is a physical quantity other than temperature, which is dependent on the temperature. The physical quantity sensor 101 is, for example, a pressure sensor, an acceleration sensor, a gyro (angle or angular velocity) sensor, a flow rate sensor, or the like. The temperature sensor 102 is a sensor element which generates an output signal corresponding to a detected temperature of the medium under measurement. The Vcc voltage divider unit 103 divides up a power supply voltage which is supplied via a Vcc terminal. The physical quantity sensor 101 and the temperature sensor 102 may employ commonly sensor elements. The outputs signals of the physical quantity sensor 101, the temperature sensor 102 and the Vcc voltage divider unit 103 are input to the computing unit 104.

In the operating mode 1 of the physical quantity sensor apparatus 100, the computing unit 104 is controlled so as to output the output value of the physical quantity sensor 101 (called the initial output value below), and the initial output value of the temperature sensor 102 and the initial output value of the Vcc voltage divider unit 103, directly without carrying out a computing process. The respective initial output values of the physical quantity sensor 101, the temperature sensor 102 and the Vcc voltage divider unit 103 are information for obtaining initial output characteristics of the physical quantity sensor apparatus 100. On the other hand, in the operating mode 3 of the physical quantity sensor apparatus 100, the computing unit 104 is controlled so as to compute a desired output value (called the "corrected output value" of the physical quantity sensor 101 below) of the physical quantity sensor 101. More specifically, in the operating mode 3 of the physical quantity sensor apparatus 100, the computing unit 104 computes a corrected value of the physical quantity sensor 101 on the basis of the output value of the physical quantity sensor 101, the output value of the temperature sensor 102 and the initial settings information. The computing unit 104, for example, reads out and uses the initial settings information that has been written to the storage unit 105.

The computing unit 104 includes a first characteristics formula, which is a second-order or higher-order polynomial expression in which the output value of the physical quantity sensor 101 is a variable, and a second characteristics formula, which is a second-order or higher-order polynomial expression in which the output value of the temperature sensor 102 is a variable. The computing unit 104 calculates a corrected first characteristic value on the basis of the second characteristics formula, by inputting the output value of the temperature sensor 102 and the second characteristic value. Moreover, the computing unit 104 computes a corrected output value for the physical quantity sensor 101 on the basis of the first characteristics formula, in which the coefficients and constant terms (first characteristic values) have been corrected, by inputting the corrected first characteristic values and the output value of the physical quantity sensor 101.

In this way, the computing unit 104 is constituted by a computing circuit equivalent to one transmission function for computing a corrected output value for the physical quantity sensor 101 by means of the first characteristics formula and the second characteristics formula, or a circuit for processing a computing program. Upon receiving input of an output signal from the physical quantity sensor 101 and an output signal from the temperature sensor 102, the computing unit 104 can compute a corrected output value for the physical quantity sensor 101 by acquiring the second characteristic values. Moreover, the computing unit 104 may compute a corrected output value of the physical quantity sensor 101 which is directly proportional to the power supply voltage, on the basis of the output value of the Vcc voltage divider unit 103.

When computing the corrected output value for the physical quantity sensor 101 on the basis of the output value of the Vcc voltage divider unit 103, the computing unit 104 increases or decreases the corrected output value of the physical quantity sensor 101 by an amplification ratio (=Vcc/Vcc0) of the output value Vcc of the Vcc voltage divider unit 103, divided by a reference output Vcc0 of the Vcc voltage divider unit 103 (called "reference output value" below). More specifically, if the amplification ratio is +10%, then the computing unit 104 increases the corrected output value of the physical quantity sensor 101 by +10%.

The storage unit 105 stores at least the second characteristic values as initial settings information for the physical quantity sensor apparatus 100. The initial settings information of the physical quantity sensor apparatus 100 is stored in the storage unit 105, in the operating mode 2 of the physical quantity sensor apparatus 100. The input/output unit 106 externally outputs the corrected output value of the physical quantity sensor 101, the output value of the temperature sensor 102 and the output value of the Vcc voltage divider unit 103. Furthermore, the input/output unit 106 respectively outputs the initial output values of the physical quantity sensor 101, the temperature sensor 102 and the Vcc voltage divider unit 103, to the setting apparatus 110. The input/output unit 106 receives input of the initial settings information for the physical quantity sensor apparatus 100 from the setting apparatus 110.

The setting apparatus 110 is constituted by a first acquiring unit 111, a second acquiring unit 112, a first calculating unit 113, a second calculating unit 114 and an input/output unit 115. The first acquiring unit 111 respectively acquires at least three initial output values output by the physical quantity sensor 101 for each of at least three predetermined temperatures, from the input/output unit 106 of the physical quantity sensor apparatus 100 via the input/output unit 115. Consequently, the first acquiring unit 111 acquires at least a total of nine initial output values from the physical quantity sensor 101. The first acquiring unit 111 may acquire an output value from the Vcc voltage divider unit 103.

The second acquiring unit 112 respectively acquires previously established target output values for the physical quantity sensor 101 in accordance with each of the plurality of initial output values of the physical quantity sensor 101. Consequently, the second acquiring unit 112 acquires a total of at least nine target output values for the physical quantity sensor 101. The predetermined temperature and the target output values for the physical quantity sensor 101 may be previously stored in a storage unit (not illustrated) of the setting apparatus 110, or may be received by input means (not illustrated).

The first calculating unit 113 calculates a first characteristic value for calculating corrected output values of the physical quantity sensor 101, on the basis of the initial output values and the target output values of the physical quantity sensor 101. More specifically, the first calculating unit 113 calculates the first characteristics formula by approximating the initial output value of the physical quantity sensor 101 and the target output value of the physical quantity sensor 101, for each predetermined temperature, to a second-order or higher-order polynomial expression, by a least-square method, for example. The first calculating unit 113 sets the coefficient and the constant term of the first characteristics formula calculated for each predetermined temperature as the first characteristic values.

More specifically, in a case where initial output values of the physical quantity sensor 101 for n predetermined physical quantities are acquired by the first acquiring unit 111 for each of m predetermined temperatures (the number of measurement points of the output value of the physical quantity sensor is n, and the number of measurement points of the output value of the temperature sensor is m), then the first calculating unit 113 calculates an X-order polynomial expressions (where $2 \leq X \leq n-1$) for each of the m predetermined temperatures, and calculates Formula (1) below on the basis of these X-order polynomial expressions. Formula (1) below is a first characteristics formula which is constituted by the computing unit 104.

In Formula (1) below, Vd is an output value of the physical quantity sensor 101 when the physical quantity sensor apparatus is in operating mode 3, and $\Delta T$ is the detection temperature of the temperature sensor 102 (the output value of the temperature sensor 102) when the physical quantity sensor apparatus is in operating mode 3 (the same applies to Formula (2) and Formula (3) below). The detection temperature $\Delta T$ is the output value of the temperature sensor 102 in relation to the reference temperature of $T_0=25°$ C. The first calculating unit 113 calculates the coefficients and constant terms of the X-order polynomial expressions calculated for each of the m predetermined temperatures, $k_{ij}$, i=1, 2, ... n, j=X, X-1, ..., 1, 0, as the first characteristic values.

$$\text{Vout}_i(\Delta T, Vd) = K_{iX}(\Delta T) \times Vd^X + K_{iX-1}(\Delta T) \times Vd^{X-1} + \ldots + K_{i1}(\Delta T) \times Vd + K_{i0}(\Delta T)(i=1,2,\ldots,n) \quad (1)$$

The first calculating unit 113 may further calculate the first characteristics formula on the basis of the output values of the Vcc voltage divider unit 103. In this case, the first calculating unit 113 calculates the first characteristics formula shown in Formula (2) below. In Formula (2) given below, Vcc is the output value of the Vcc voltage divider unit 103 when the physical quantity sensor apparatus 100 is in operating mode 2. In this case, the first characteristic values are: $k_{ij} \times Vcc/Vcc0$, i=1, 2, ..., n; j=X, X-1, ..., 1, 0.

$$\text{Vout}_i(\Delta T, Vd) = \{K_{iX}(\Delta T) \times Vd^X + K_{iX-1}(\Delta T) \times Vd^{X-1} + \ldots + K_{i1}(\Delta T) \times Vd + K_{i0}(\Delta T)\} \times Vcc/Vcc0(i=1,2,\ldots,n) \quad (2)$$

The second calculating unit 114 calculates the second characteristic values for calculating the approximation equation $K_i(\Delta T)$, i=1, 2, ..., n of the first characteristic values, on the basis of the predetermined temperature and the first characteristic values. More specifically, the second calculating unit 114 calculates the second characteristics formula by approximating the predetermined temperature and the first characteristic values $k_{ij}$, to a second-order or higher-order polynomial expression by a least-square method, for example, for each first characteristic value $k_{ij}$. The second characteristics formula is expressed by Formula (3) below. The second calculating unit 114 then sets the coefficients and constant terms of the second characteristics formula $kT_{ij}$, i=, 1, 2, . . . , n; j=Y (2≤Y≤m−1), Y−1, . . . , 0 as the second characteristic values. The second characteristic values calculated by the second calculating unit 114 are output to the input/output unit 116 of the physical quantity sensor apparatus 100 via the input/output unit 115. The method of calculating the first and second characteristics formula and the first and second characteristic values is described hereinafter.

$$K_i(\Delta T) = kT_{iY} \times \Delta T^X + kT_{iY-1} \times \Delta T^{X-1} + \ldots + kT_{i1} \times \Delta T + kT_{i0}$$
$$(i=1,2,\ldots,n) \quad (3)$$

Figure 2:
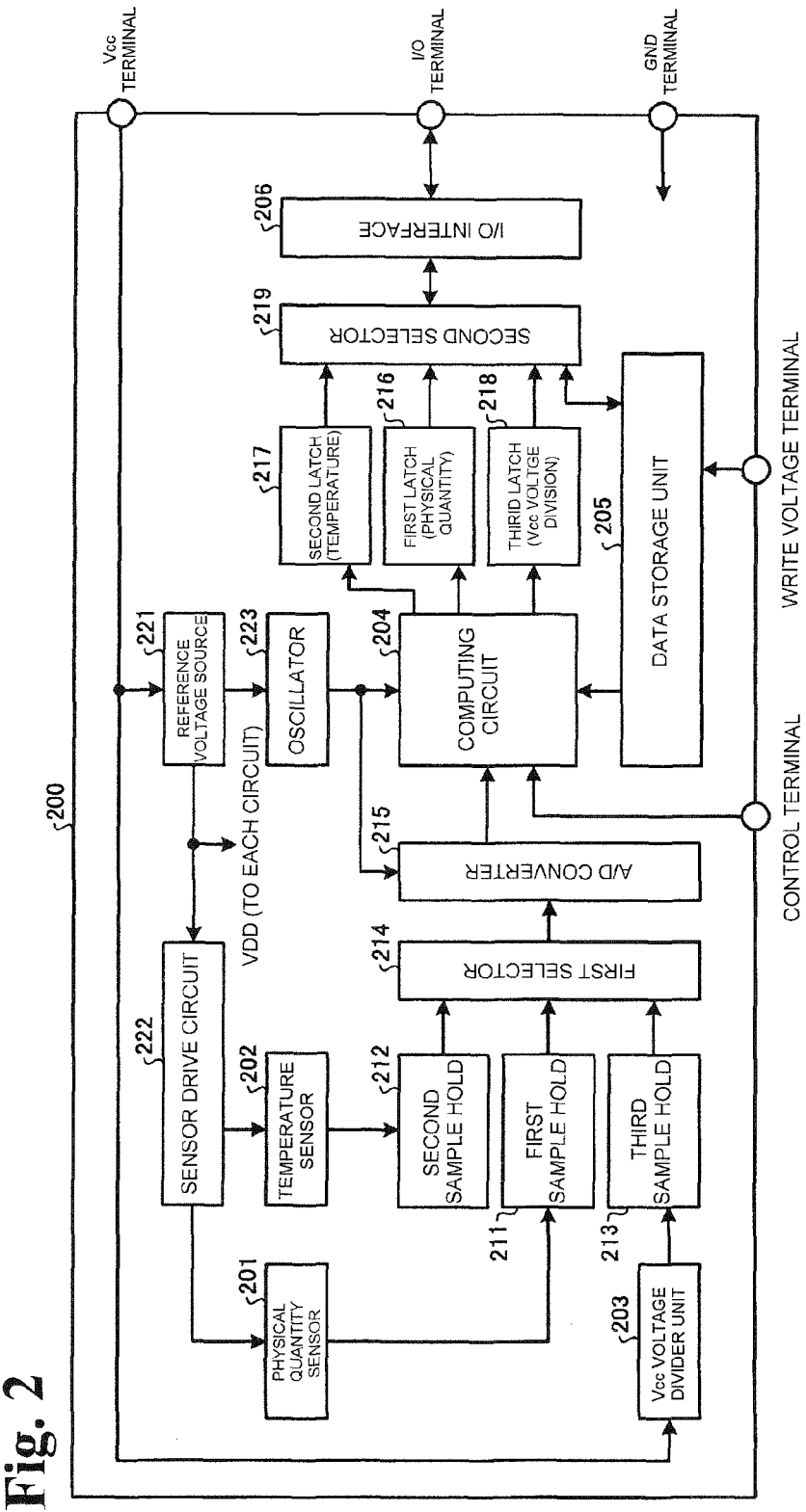
FIG. 2 is a block diagram showing one example of the overall composition of a semiconductor physical quantity sensor apparatus formed on a semiconductor chip by applying the present invention.

Next, one example of the overall composition of the physical quantity sensor apparatus 100 shown in FIG. 1 will be described with reference to FIG. 2. FIG. 2 is a block diagram showing one example of the overall composition of a semiconductor physical quantity sensor apparatus formed on top of a semiconductor chip by applying the present invention. The physical quantity sensor apparatus 200 is constituted by a physical quantity sensor 201, a temperature sensor 202, a Vcc voltage divider unit 203, a computing circuit 204, a data storage unit 205, an I/O (Input/Output) interface 206, first to third sample hold circuits 211 to 213, first and second selectors 214 and 219, an A/D converter 215, first to third latch circuits 216 to 218, a reference voltage source 221, a sensor drive circuit 222 and an oscillator 223.

The physical quantity sensor 201, the temperature sensor 202 and the Vcc voltage divider unit 203 correspond to the abovementioned physical quantity sensor 101, temperature sensor 102 and Vcc voltage divider unit 103. The output signals from the physical quantity sensor 201, the temperature sensor 202 and the Vcc voltage divider unit 203 are analog signals, for example. The first to third sample hold circuits 211 to 213 are arranged respectively after the physical quantity sensor 201, the temperature sensor 202 and the Vcc voltage divider unit 203. The A/D converter 215 is arranged after the first to third sample hold circuits 211 to 213, via the first selector 214.

The first sample hold circuit 211 acquires (samples) an analog signal which is input continuously from the physical quantity sensor 201, at set time intervals, and holds the sampled signal for a set period of time. The second sample hold circuit 212 samples an analog signal which is input continuously from the temperature sensor 202, at set time intervals, and holds the sampled signal for a set period of time. The third sample hold circuit 213 samples an analog signal input continuously from the Vcc voltage divider unit 203, at set time intervals, and holds the sample signal for a set period of time.

The first selector 214 selects one of the analog signals input from the first to third sample hold circuits 211 to 213, and outputs the signal to the A/D converter 215. The A/D converter 215 converts the analog signal selected by the first selector 214 into a digital signal and outputs the digital signal to the computing circuit 204. In other words, the analog signals generated by the physical quantity sensor 201, the temperature sensor 202 and the Vcc voltage divider unit 203 are digitalized, and are output to a computing circuit 204 in a subsequent stage.

The computing circuit 204 and the data storage unit 205 respectively correspond to the computing unit 104 and the storage unit 105 described above. The computing circuit 204 is controlled in respect of whether or not to carry out processing for computing a corrected output value for the physical quantity sensor 201, by a control signal which is input from the control terminal. More specifically, if the control signal from the control terminal is "1: ON", for example, then the computing circuit 204 reads out the initial settings information stored previously in the data storage unit 205, and amplifies the output signal of the physical quantity sensor 201 by a predetermined amplification ratio on the basis of this initial settings information (operating mode 3).

On the other hand, if the control signal from the control terminal is "0: OFF", for example, then the computing circuit 204 does not carry out a computing process and directly outputs the digital signal input from the A/D converter 215 (operating mode 1). Therefore, the output signals (hereinafter called "digital signals") from the physical quantity sensor 201, the temperature sensor 202 and the Vcc voltage divider unit 203, which are digitalized via the A/D converter 215, are respectively input, as unaltered initial output values, to the first to third latch circuits 216 to 218 in a subsequent stage.

The first to third latch circuits 216 to 218 respectively hold, for a predetermined period of time, the digital signal from the physical quantity sensor 201, the digital signal from the temperature sensor 202, and the digital signal from the Vcc voltage divider unit 203. The second selector 219 selects one of the digital signals input from the first to third latch circuits 216 to 218 and outputs the signal to the I/O interface 206. Furthermore, when a digital signal is input to the I/O interface 206 from an external source, the second selector 219 is switched so as to connect the I/O interface 206 and the data storage unit 205. The second selector 219 outputs the digital signal input to the I/O interface 206, to the data storage unit 205.

The I/O interface 206 corresponds to the input/output unit 106 described above. The I/O interface 206 is set to output mode when a digital signal has been input from the second selector 219, for example, (in operating mode 1 or 3), and outputs the digital signal input from the second selector 219, externally, from the I/O terminal. On the other hand, the I/O interface 206 is set to input mode when a digital signal has been input from an external source via the I/O terminal, for example (operating mode 2), and outputs the digital signal input from the external source, to the second selector 219.

The digital signal input to the I/O interface 206 from an external source is the initial settings information of the physical quantity sensor apparatus 200 which is calculated by the setting apparatus 110 described above. The digital signal input to the I/O interface 206 from an external source is input to the data storage unit 205 via the second selector 219. The digital signal input from the second selector 219 to the data storage unit 205 is stored semi-permanently in the data storage unit 205 due to a predetermined voltage being applied to the data storage unit 205 via a write voltage terminal.

The reference voltage source 221 averages the noise of the power supply voltage supplied from the Vcc terminal, generates a reference voltage suited to driving the sensor drive circuit 222, and supplies the reference voltage to the sensor drive circuit 222. Furthermore, the reference voltage source 221 supplies a voltage VDD to the oscillator 223 and each circuit in the physical quantity sensor apparatus 200. The sensor drive circuit 222 generates a voltage of a predetermined magnitude for driving the physical quantity sensor 201 and the temperature sensor 202, and supplies this voltage to the physical quantity sensor 201 and the temperature sensor 202. The oscillator 223 generates a clock signal for driving the A/D converter 215 and the computing circuit 204, and supplies this clock signal to the A/D converter 215 and the computing circuit 204.

Next, the operating modes 1 to 3 of the physical quantity sensor apparatus 200 will be described in detail. Firstly, the operating mode 1 of the physical quantity sensor apparatus 200 will be described. The operating mode 1 is an operating mode for acquiring initial output characteristics of the physical quantity sensor 201, in the step of adjusting the initial settings of the physical quantity sensor apparatus 200. In operating mode 1, firstly, the analog signals from the physical quantity sensor 201, the temperature sensor 202 and the Vcc voltage divider unit 203 are respectively input to the first to third sample hold circuits 211 to 213, and holding and updating of the voltage values are repeated at set time intervals.

The voltage values held by the first to third sample hold circuits 211 to 213 are sequentially input to the A/D converter 215, in accordance with a predetermined selection sequence, for example, by the first selector 214, and are converted from analog signals to digital signals. The voltage values from the physical quantity sensor 201, the temperature sensor 202 and the Vcc voltage divider unit 203, which have been converted to digital values by the A/D converter 215, are input to the computing circuit 204.

In operating mode 1, the computing circuit 204 inputs a control signal "0: OFF" from the control terminal and is thereby controlled so as not to carry out a computing process. Therefore, the voltage value input from the A/D converter 215 to the computing circuit 204 is output to and held by the first to third latch circuits 216 to 218, without alteration, in a state in which a computing process is not carried out by the computing circuit 204. The voltage values held by the first to third latch circuits 216 to 218 are output sequentially to the I/O interface 206 in a predetermined selection sequence, for example, by the second selector 219, and are then output externally from the I/O terminal. With this, the operating mode 1 of the physical quantity sensor apparatus 200 is terminated.

In this way, the output values of the physical quantity sensor 201, the temperature sensor 202 and the Vcc voltage divider unit 203 when in operating mode 1 are not subjected to the computing process by the computing circuit 204 and externally output directly as initial output values without alternation, and then acquired by the first acquiring unit 111 described above. The predetermined temperature when the initial output value of the physical quantity sensor 201 is output externally is confirmed by the initial output value of the temperature sensor 202, for example. Consequently, it is possible to obtain the initial output characteristics of the physical quantity sensor apparatus 200 for calculating Formula (1) described above (or Formula (2) described above) and Formula (3) above.

Next, the operating mode 2 of the physical quantity sensor apparatus 200 will be described. Operating mode 2 is an operating mode for writing initial settings information to the data storage unit 205 of the physical quantity sensor apparatus 200 from an external source. In operating mode 2, firstly, initial settings information for the physical quantity sensor apparatus 200 is input to the I/O interface 206 from an external source, via the I/O terminal. The initial settings information is information that is calculated by the second calculating unit 114 described above. Due to the input of the initial settings information to the I/O interface 206, the I/O interface 206 is switched from output mode to input mode.

Moreover, by inputting initial settings information to the I/O interface 206, the second selector 219 switches to a path that connects the I/O interface 206 and the data storage unit 205. The initial settings information input to the I/O interface 206 is stored in the data storage unit 205 via the second selector 219. In this state, due to a predetermined voltage being applied to the data storage unit 205 from the write voltage terminal, the initial settings information stored in the data storage unit 205 is transferred to a non-volatile memory in the data storage unit 205. Consequently, the initial settings information is held semi-permanently in the data storage unit 205, and the operating mode 2 of the physical quantity sensor apparatus 200 terminates.

Next, the operating mode 3 of the physical quantity sensor apparatus 200 will be described. The operating mode 3 is an operating mode for actual use, or pre-shipment testing, or the like, of the physical quantity sensor apparatus 200, and in operating mode 3, a corrected output value of the physical quantity sensor 201 is output. In the operating mode 3, firstly, similarly to operating mode 1, the output signals of the physical quantity sensor 201, the temperature sensor 202 and the Vcc voltage divider unit 203 are respectively input to the computing circuit 204 via the first to third sample hold circuits 211 to 213, the first selector 214 and the A/D converter 215.

Thereupon, the initial settings information stored in the data storage unit 205 is also input to the computing circuit 204. As described above, the initial settings information stored in the data storage unit 205 is the second characteristic values calculated by the second calculating unit 114. Consequently, the output value Vd of the physical quantity sensor 201, the detection temperature $\Delta T$ of the temperature sensor 202, the output value Vcc of the Vcc voltage divider unit 203, and the second characteristic values, $kT_{ij}$, I=1, 2, ..., n; j=Y, Y-1, ..., 0, are input into Formula (1) above (or Formula (2) above) and Formula (3) above, and a corrected output value for the physical quantity sensor 201 is computed.

Subsequently, the corrected output value of the physical quantity sensor 201 computed by the computing circuit 204 is output to the first latch circuit 216, and input to the I/O interface 206 via the second selector 219. Consequently, a corrected output value for the physical quantity sensor 201 is output externally from the I/O terminal, and the operating mode 3 of the physical quantity sensor apparatus 200 is terminated. The operating modes 1 to 3 of the physical quantity sensor apparatus 200 described above may be controlled by program by a control unit (not illustrated), or may be controlled mechanically or artificially by an on/off switch.

Figure 3:
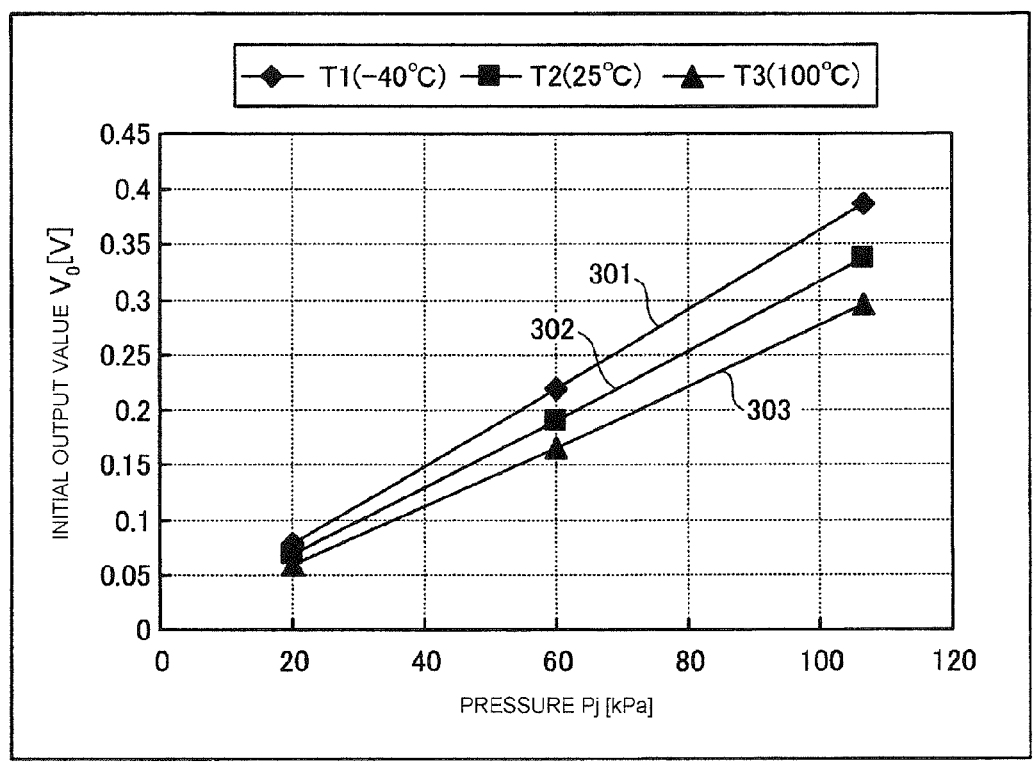
FIG. 3 is a characteristics graph showing one example of uncorrected output characteristics of the physical quantity sensor apparatus according to an embodiment of the present invention.
Figure 4:
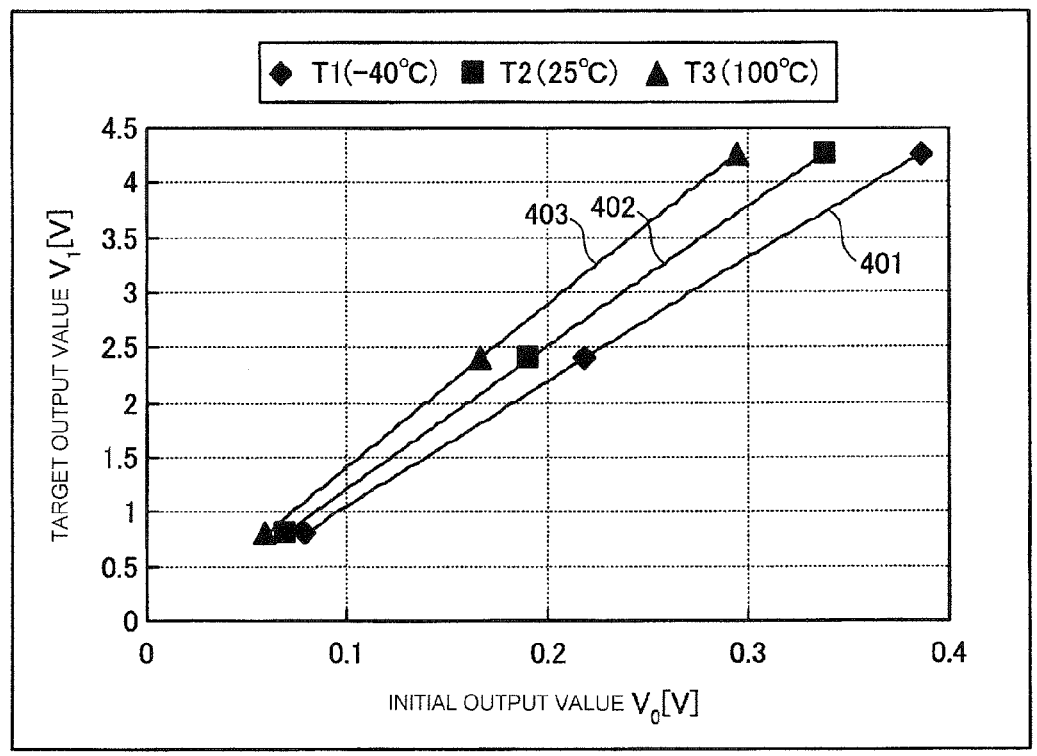
FIG. 4 is a characteristics graph showing one example of target output characteristics of the physical quantity sensor apparatus according to an embodiment of the present invention.
Figure 5:
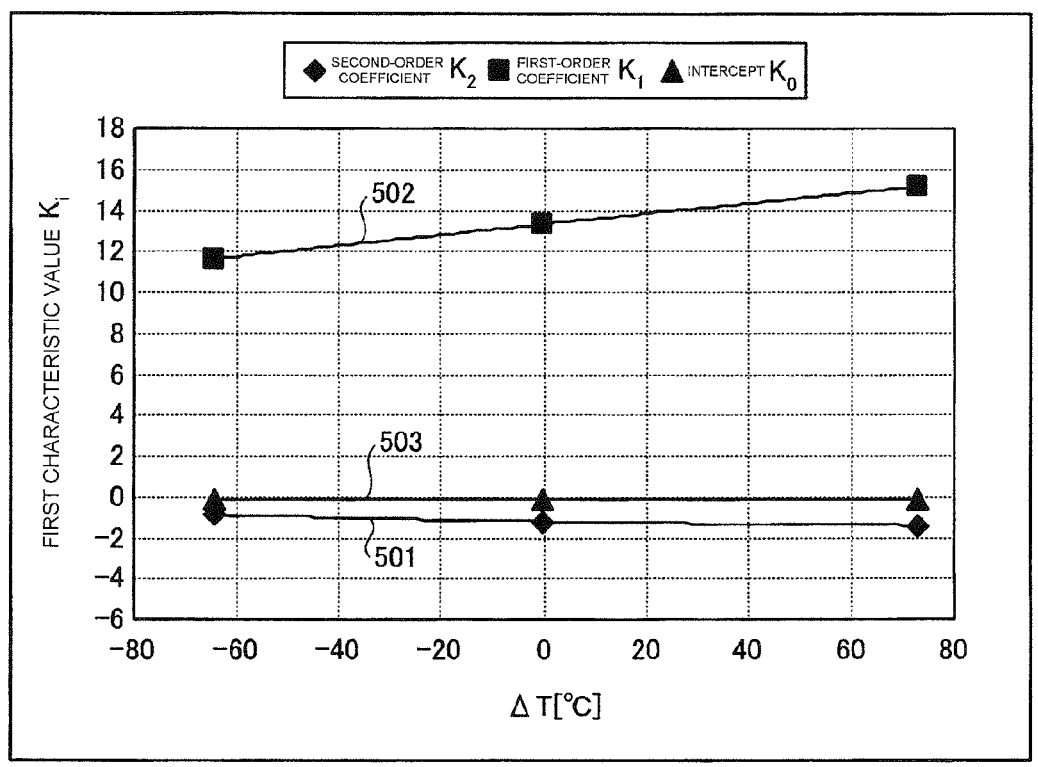
FIG. 5 is a characteristics graph showing temperature dependence of the physical quantity sensor apparatus according to an embodiment of the present invention.

The method of calculating the first and second characteristics formulas and the first and second characteristic values, and the method of computing the corrected output value for the physical quantity sensor are now described with reference to FIGS. 3 to 5. FIG. 3 is a characteristics graph showing one example of the output characteristics before correction of the physical quantity sensor apparatus relating to an embodiment of the present invention. Furthermore, FIG. 4 is a characteristics graph showing one example of the target output characteristics of the physical quantity sensor apparatus relating to an embodiment of the present invention. FIG. 5 is a characteristics graph showing the temperature dependence of the physical quantity sensor apparatus relating to an embodiment of the present invention. An example is described here in which, in the operating mode 1 of the physical quantity sensor apparatus which uses a pressure sensor as a physical quantity sensor, three pressures P1 to P3 are detected by the pressure sensor at each one of three predetermined temperatures T1 to T3. The predetermined temperatures T1 to T3 are, respectively, −40° C., 25° C. and 100° C., for example.

Firstly, as shown in FIG. 3, a total of nine initial output values $V_0$ of the pressure sensor are acquired by the first acquiring unit 111. Next, the pressure Pj, j=1, 2, 3 is plotted on the horizontal axis, the initial output value $V_0$ of the pressure sensor is plotted on the vertical axis, and the pressure Pj and the initial output value $V_0$ are approximated to a second-order polynomial expression for each predetermined temperature T1 to T3. Consequently, the initial output characteristics 301 to 303 of the pressure sensor which change in the form of a second-order curve with respect to the detected pressure Pj are obtained. The graph which indicates the initial output characteristics 301 to 303 of the pressure sensor shown in FIG. 3 is a second-order curve (the graphs in FIGS. 4 and 5 are also second-order curves). The values of the pressures P1 to P3 and the initial output values $V_0$ of the pressure sensor shown in FIG. 3 are examples.

Thereupon, nine target output values $V_1$ corresponding respectively to the nine initial output values $V_0$ of the pressure sensor are acquired by the second acquiring unit 112. Next, as shown in FIG. 4, the initial output value $V_0$ of the pressure sensor is plotted on the horizontal axis, the target output value $V_1$ of the pressure sensor is plotted on the vertical axis, and the initial output value $V_0$ and the target output value $V_1$ are approximated to a second-order polynomial expression by a least-square method, for each of the predetermined temperatures T1 to T3. Therefore, corrected output characteristics 401 to 403 for the pressure sensor are obtained for each of the predetermined temperatures T1 to T3. The approximation formulas $V_1(T1)$ to $V_1(T3)$ for the target output value of the pressure sensor at the predetermined temperatures T1 to T3 are expressed by Formula (4) to Formula (6) given below.

$$V_1(T1) = -0.88 \times V_0^2 + 11.66 \times V_0 - 0.10 \quad (4)$$

$$V_1(T2) = -1.19 \times V_0^2 + 13.34 \times V_0 - 0.11 \quad (5)$$

$$V_1(T3) = -1.40 \times V_0^2 + 15.17 \times V_0 - 0.09 \quad (6)$$

By Formula (4) to Formula (6) given above, $V_1(Ti)$ and the second-order coefficient $k_{i2}$, the first-order coefficient $k_{i1}$ and the constant term $k_{i0}$ for i=1, 2, 3 are extracted as the first characteristic values. In the operating mode 3 of the physical quantity sensor apparatus, the initial output value $V_0$ and the target output value $V_1$ in the abovementioned Formula (4) to Formula (6) correspond respectively to the output value Vd of the pressure sensor and the corrected output value Vout of the pressure sensor. Therefore, Formula (4) to Formula (6) above can be expressed as indicated in Formula (7) below. Formula (7) below corresponds to Formula (1) above when n, m=3, and is a first characteristics formula which expresses the corrected output characteristics of the pressure sensor.

$$V\text{out}(\Delta T, Vd) = K_2(\Delta T) \times Vd^2 + K_1(\Delta T) \times Vd + K_0(\Delta T) \quad (7)$$

Next, in Formula (4) to Formula (6) given above, the respective differentials ΔT between the predetermined temperatures T1 to T3 and the reference temperature $T_0$ (for example, $T_0=25°$ C.), and the second-order coefficients $k_{12}=-0.88$, $k_{22}=-1.19$ and $k_{32}=-1.40$ are approximated to a second-order polynomial expression by a least-square method. Similarly, the differentials ΔT, and the first-order coefficients $k_{11}=11.66$, $k_{21}=13.34$ and $k_{31}=15.17$ are approximated to a second-order polynomial expression by a least-square method. The differentials ΔT and the constant terms $k_{10}=-0.10$, $k_{20}=-0.11$ and $k_{30}=-0.09$ are approximated to a second-order polynomial expression by a least-square method.

Consequently, as shown in FIG. 5, the approximation formulas for the coefficients and constant terms in Formula (7) above, $K_2(\Delta T)$, $K_1(\Delta T)$ and $K_0(\Delta T)$ indicate second-order curves 501 to 503 which represent the temperature dependence characteristics, and are expressed by Formula (8) to Formula (10) below. In operating mode 3 of the physical quantity sensor apparatus, the differentials ΔT between the predetermined temperatures T1 to T3 and the reference temperature $T_0$ (for example, $T_0=25°$ C.) correspond to the detection temperature of the temperature sensor (the temperature sensor output value) at the reference temperature $T_0=25°$ C. Therefore, the approximation formula for the first characteristic values, $K_i(\Delta T)$, i=0, 1, 2 is expressed by Formula (8) to Formula (10) given below.

$$K_2(\Delta T) = -1.5 \times 10^{-5} \times \Delta T^2 - 3.9 \times 10^{-3} \times \Delta T - 1.2 \quad (8)$$

$$K_1(\Delta T) = -7.8 \times 10^{-6} \times \Delta T^2 - 2.6 \times 10^{-2} \times \Delta T - 1.3 \times 10 \quad (9)$$

$$K_0(\Delta T) = 2.4 \times 10^{-6} \times \Delta T^2 - 1.1 \times 10^{-4} \times \Delta T - 1.1 \times 10^{-1} \quad (10)$$

Formula (8) to Formula (10) given above can be extracted as Formula (11) below which is dependent on the temperature ΔT. Formula (11) below corresponds to Formula (3) above when n=3, and is a second characteristics formula indicating the temperature dependence characteristics of the first characteristic values. The second-order coefficient $kT_{22}=-1.5 \times 10^{-5}$, the first-order coefficient $kT_{21}=-3.9 \times 10^{-3}$ and the constant term $kT_{20}=-1.2$ of $K_2(\Delta T)$ in Formula (8) above, the second-order coefficient $kT_{12}=-7.8 \times 10^{-6}$, the first-order coefficient $kT_{11}=-2.6 \times 10^{-2}$ and the constant term $kT_{10}=-1.3 \times 10$ of $K_1(\Delta T)$ in Formula (9) above, and the second-order coefficient $kT_{02}=2.4 \times 10^{-6}$, the first-order coefficient $kT_{01}=-1.1 \times 10^{-4}$ and the constant term $kT_{00}=-1.1 \times 10^{-1}$ of $K_0(\Delta T)$ in Formula (10) above, are extracted as second characteristic values.

$$K_i(\Delta T) = kT_{i2} \times \Delta T^2 + kT_{i1} \times \Delta T + kT_{i0} (i=0,1,2) \quad (11)$$

In operating mode 2 of the physical quantity sensor apparatus, the nine second characteristic values obtained in this way (called the "correction parameters" below) $kT_{ij}$, i=0, 1, 2; j=2, 1, 0 are stored in the data storage unit 205 of the physical quantity sensor apparatus as correction parameters for correcting the output characteristics of the physical quantity sensor. Thereupon, in operating mode 3 of the physical quantity sensor apparatus, the detection temperature ΔT of the temperature sensor and the nine correction parameters $kT_{ij}$ are input to the computing circuit 204, and a computing process is carried out using Formula (8) to Formula (10) above, thereby calculating $K_i(\Delta T)$, i=0, 1, 2. $K_i(\Delta T)$, i=0, 1, 2 gives the coefficient and constant terms of Formula (7) above, and therefore when the output value Vd of the pressure sensor is input to the computing circuit 204, the corrected output value Vout of the pressure sensor can be calculated by using Formula (7) above.

Next, the nine correction parameters (second characteristic values) $kT_{ij}$ mentioned above will be described. FIG. 6 is an illustrative diagram showing details of the characteristics of a physical quantity sensor apparatus with respect to temperature, according to an embodiment of the present invention. FIG. 6 shows one example of the numerical values of the correction parameters indicated by Formula (8) to Formula (10) above, and the meaning of each parameter (the characteristic with respect to temperature). The nine correction parameters $kT_{ij}$ described above respectively express different characteristics with respect to the temperature of the physical quantity sensor apparatus. Therefore, it is possible to accurately confirm the characteristics of the physical quantity sensor apparatus with respect to temperature by means of the nine correction parameters $kT_{ij}$.

More specifically, as shown in FIG. 6, the second-order coefficient $kT_{22}$ of $K_2(\Delta T)$ is the curve component with respect to temperature of the sensitivity curve (the non-linearity of the sensitivity). The first-order coefficient $kT_{21}$ of $K_2(\Delta T)$ is the gradient with respect to temperature of the sensitivity curve (the non-linearity of the sensitivity). The constant term $kT_{20}$ of $K_2(\Delta T)$ is the sensitivity curve (the non-linearity of the sensitivity) at the reference temperature. The second-order coefficient $kT_{12}$ of $K_1(\Delta T)$ is the curve component with respect to temperature of the sensitivity amplification ratio. The first-order coefficient $kT_{11}$ of $K_1(\Delta T)$ is the gradient with respect to temperature of the sensitivity amplification ratio. The constant term $kT_{10}$ of $K_1(\Delta T)$ is the sensitivity amplification ratio at the reference temperature.

The second-order coefficient $kT_{02}$ of $K_0(\Delta T)$ is the curve component with respect to temperature of the offset. The first-order coefficient $kT_{01}$ of $K_0(\Delta T)$ is the gradient with respect to temperature of the offset. The constant term $kT_{00}$ of $K_0(\Delta T)$ is the offset correction amount at the reference temperature. These nine correction parameters $kT_{ij}$ are obtained for each physical quantity sensor apparatus that is manufactured. Therefore, by consulting the history of correction parameters $kT_{ij}$ of physical quantity sensor apparatuses that have been manufactured in the past, to check for correction parameters $kT_{ij}$ that are not in a predetermined numerical range, for example, it is possible to check whether or not there is a problem with the temperature characteristics indicated by the correction parameter $kT_{ij}$.

Moreover, if the first and second characteristics formulas are calculated by approximation using third-order or fourth-order polynomial expressions, then the number of correction parameters $kT_{ij}$ becomes 12 to 16 if approximation is made using a third-order polynomial expression, and 15 to 25 if approximation is made using a fourth-order polynomial expression. For instance, if the first characteristics formula is approximated to a third-order polynomial expression and the second characteristics formula is approximated to a second-order polynomial expression, then it is necessary to acquire at least four outputs from the physical quantity sensor at least three predetermined temperatures. Characteristics caused by peripheral equipment, or the like, for example, appear in regular fashion in these correction parameters $kT_{ij}$. Therefore, depending on the peripheral equipment, the higher the order of the expressions in the first and second characteristics formulas, the more precisely the characteristics caused by the peripheral equipment can be confirmed, and the higher the accuracy with which the output value of the physical quantity sensor can be corrected.

Furthermore, supposing that four outputs from the physical quantity sensor are acquired respectively at four predetermined temperatures, the approximation is not limited to one based on a third-order polynomial expression, and approximation with a second-order polynomial expression is also possible. Therefore, the numbers of orders X, Y of the approximation formulas which are obtained when the numbers of measurements are m and n, satisfy: $2 \leq Y \leq m-1$, $2 \leq X \leq n-1$.

Figure 7:
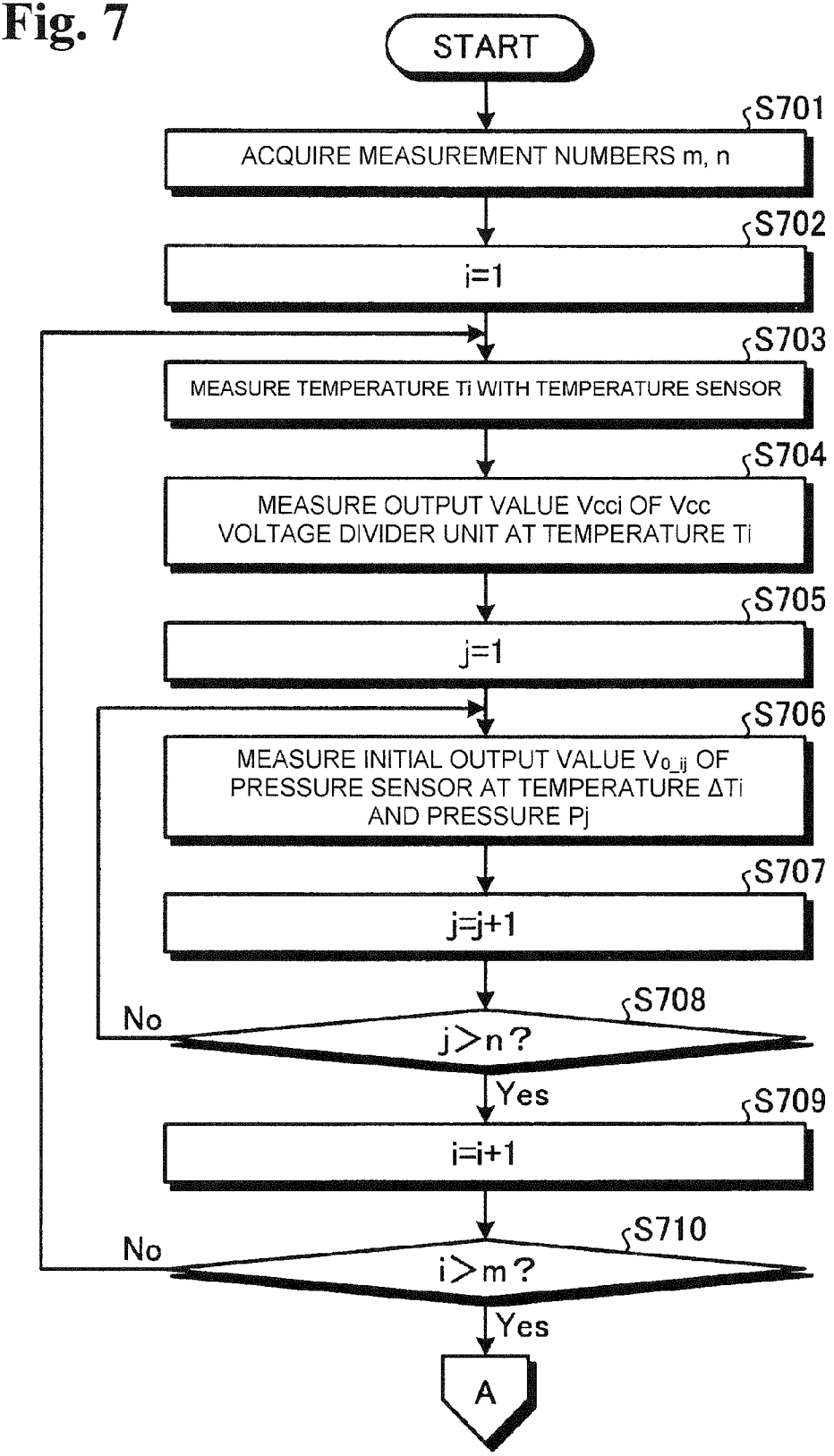
FIG. 7 is a first flowchart showing a procedure of output value correction processing by the physical quantity sensor apparatus according to an embodiment of the present invention.
Figure 8:
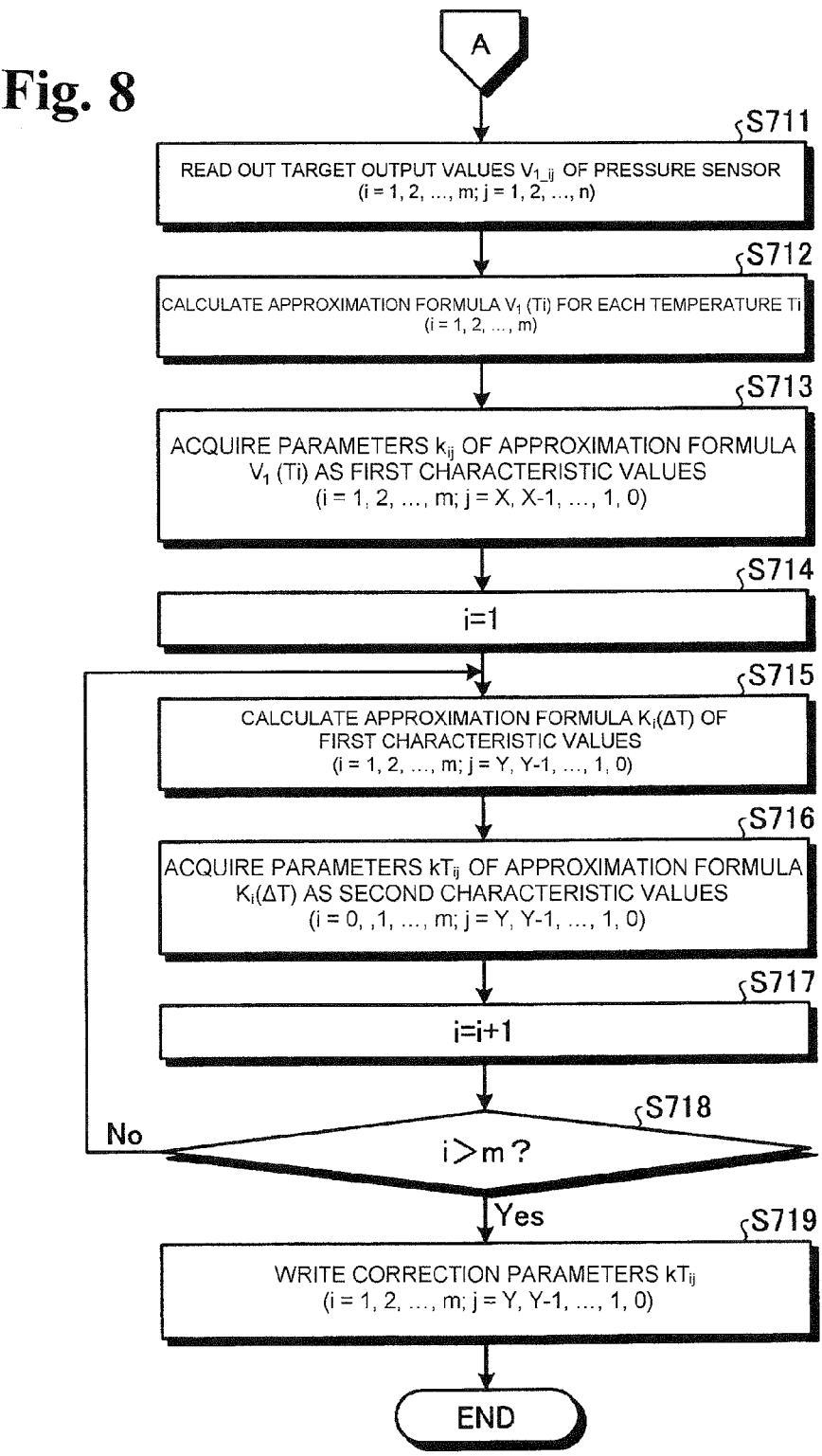
FIG. 8 is a second flowchart showing a procedure of output value correction processing by the physical quantity sensor apparatus according to an embodiment of the present invention.

Next, the procedure of an output value correction process for the physical quantity sensor apparatus relating to an embodiment of the present invention will be described. FIGS. 7 and 8 are flowcharts showing the procedure of an output value correction process for a physical quantity sensor apparatus relating to an embodiment of the present invention. FIGS. 7 and 8 show a process in which the initial settings conditions of the physical quantity sensor apparatus are calculated, up to a step of writing to the storage unit of the physical quantity sensor apparatus. Firstly, as shown in FIG. 7, the number of measurements n of the output value of the pressure sensor ($\geq 3$) and the number of measurements m of the output value of the temperature sensor ($\geq 3$) are acquired (step S701).

Thereupon, a value of 1 is substituted for the variable i (step S702), and the temperature Ti detected by the temperature sensor and the output value Vcci of the Vcc voltage divider unit at this temperature Ti are measured (steps S703 and S704). Next, a value of 1 is substituted for the variable j (step S705), and the initial output value $V_{0\_ij}$ of the pressure sensor at the temperature $\Delta Ti$ and the pressure Pj is measured (step S706). The variable j is then incremented (step S707), and the processing in steps S706 and S707 is repeated until the variable j becomes equal to the number of measurements n (step S708: No).

If the variable j is larger than the number of measurements n (step S708: Yes), then the variable i is incremented (step S709), and the processing in steps S703 to S709 is repeated until the variable i becomes equal to the number of measurements m (step S710: No). Consequently, a total of at least m×n initial output values $V_{0\_ij}$, i=1, 2, ..., m; j 0 1, 2, ..., n are measured by measuring n pressures for each of m temperatures, and these initial output values are output externally from the physical quantity sensor apparatus. The processing thus far corresponds to operating mode 1 of the physical quantity sensor apparatus. The plurality of initial output values $V_{0\_ij}$ output externally from the physical quantity sensor apparatus are acquired by the first acquiring unit of the setting apparatus.

If the variable i is greater than the number of measurements m (step S710: Yes), then target output values $V_{1\_ij}$, i=1, 2, ..., m; j=1, 2, ..., n of the pressure sensor corresponding to the initial output values $V_{0\_ij}$ are read out by the second acquiring unit of the setting apparatus (step S711). Next, the approximation formula $V_1(Ti)$ of the target output value is calculated for each temperature Ti as shown in Formula (4) to Formula (6) above, on the basis of the initial output values $V_{0\_ij}$ and the target output values $V_{1\_ij}$ (step S712). Thereupon, the coefficients and constant terms of the approximation formula $V_1(Ti)$ for the target output values, $k_{ij}$, i=1, 2, ..., m; j=X, X-1, ..., 1, 0, are acquired as first characteristic values (step S713).

Next, a value of 1 is substituted for the variable i (step S714), and an approximation formula $K_i(\Delta T)$ for the first characteristic values which are expressed in Formula (8) to Formula (10) above is calculated (step S715). Thereupon, the parameters $kT_{ij}$, i=0, 1, ..., m; j=Y, Y-1, ..., 1, 0 ($2 \leq Y \leq n-1$) of the approximation formula $K_i(\Delta T)$ for the first characteristic values are acquired as second characteristic values (step S716). The variable i is then incremented (step S717), and the processing in steps S715 to S717 is repeated until the variable i becomes equal to the number of measurements m (step S718: No). If the variable i has become greater than the number of measurements m (step S718:

Yes), then the coefficients and constant terms of the approximation formula $K_i(\Delta T)$ (the second characteristic values), $kT_{ij}$, are written to the storage unit of the physical quantity sensor apparatus as correction parameters (step S719). The processing in step S719 corresponds to operating mode 2 of the physical quantity sensor apparatus. Thereupon, the processing according to this flowchart is terminated and the physical quantity sensor apparatus thereafter operates in operating mode 3.

The output value correction process for the physical quantity sensor apparatus described in the present invention can be achieved by executing a previously prepared program in a computer, such as a personal computer, work station, or the like. This program is recorded on a computer-readable storage medium, such as a hard disk, a flexible disk, a CD-ROM, an MO, a DVD, or the like, and is executed by being read out from the storage medium by a computer. Furthermore, the program may be a transferable medium, which can be delivered via a network, such as the Internet.

As described above, according to this embodiment, corrected output values for a physical quantity sensor are computed by using a first characteristics formula which indicates corrected output characteristics of a physical quantity sensor and a second characteristics formula which indicates the temperature dependence characteristics of the coefficients and constant terms in the first characteristics formula. Therefore, even if there are curves in the initial output characteristics of the physical quantity sensor and the temperature sensor, it is possible to correct the output values of the physical quantity sensor so as to correct these curves. Consequently, it is possible to improve the correction accuracy of the physical quantity sensor apparatus.

Furthermore, according to the embodiment, a minimum of nine correction parameters should be stored in the storage unit, and therefore it is possible to use an inexpensive storage unit having a small data capacity. Consequently, it is possible to reduce the scale of the physical quantity sensor apparatus, and the physical quantity sensor apparatus can be manufactured inexpensively. Moreover, if calculating third-order first and second characteristics formulas, then 12 to 16 correction parameters should be stored in the storage unit, and if calculating fourth-order first and second characteristics formulas, then 15 to 25 correction parameters should be stored in the storage unit. Therefore, even if the number of orders of the first and second characteristics formulas is increased, the number of parameters stored in the storage unit does not increase greatly. Consequently, even it using an inexpensive storage unit having a small data capacity, it is possible to increase the correction parameters by calculating third-order or fourth-order first and second characteristics formulas, and to readily correct curves caused by peripheral equipment.

Furthermore, according to this embodiment, it is possible to compute a corrected output value for the physical quantity sensor, simply by inputting the output value of the physical quantity sensor, the output of the temperature sensor and the second characteristic values, into one transfer function including a first characteristics formula and a second characteristics formula which constitutes the first characteristics formula. Therefore, it is possible to compute a corrected output value for the physical quantity sensor by using a computing circuit which constitutes the abovementioned transfer function formula simply using basic circuits, such as OR circuits or AND circuits, and the like. Consequently, the scale of the physical quantity sensor apparatus can be reduced, and the physical quantity sensor apparatus can be manufactured inexpensively. Moreover, the processing speed can also be accelerated.

Furthermore, according to the embodiment, in order to calculate correction parameters for correcting the output characteristics of the physical quantity sensor, initial output values of the physical quantity sensor should be acquired at a minimum of nine measurement points (three physical quantities are measured at each one of three predetermined temperatures). Therefore, it is possible to manufacture the physical quantity sensor apparatus inexpensively. Furthermore, for example, by increasing the number of measurement points, so as to measure four physical quantities at each one of four predetermined temperatures, the approximation accuracy for calculating the first and second characteristics formulas is improved. Accordingly, the correction accuracy of the physical amount sensor apparatus can be improved.

In the foregoing, the present invention is not limited to the embodiments described above, and can be modified in various ways. For example, a setting apparatus for calculating correction parameters may be provided inside the physical quantity sensor apparatus. In this case, a composition is adopted in which correction parameters are calculated again by the setting apparatus, for instance, when the peripheral equipment is changed in operating mode 3 of the physical quantity sensor apparatus, for example. Moreover, it is also possible to provide the physical quantity sensor and other apparatuses (the output value correction apparatus of the physical quantity sensor), of the physical quantity sensor apparatus shown in FIG. 1, on the same semiconductor chip, or to provide these on different semiconductor chips. If the physical quantity sensor and the output value correction apparatus of the physical quantity sensor are provided on different semiconductor chips, then the temperature sensor may be provided on the same semiconductor chip as the physical quantity sensor, or may be constituted by a thermistor, or the like, which is not provided on the same semiconductor chip as the output value correction apparatus of the physical quantity sensor, or the physical quantity sensor. Furthermore, the physical quantity sensor does not have to be formed on a semiconductor chip.

INDUSTRIAL APPLICABILITY

As described above, the output value correction method for the physical quantity sensor apparatus, the output value correction method for a physical quantity sensor, the physical quantity sensor apparatus and the output value correction apparatus for a physical quantity sensor relating to the present invention are useful in a physical quantity sensor which detects another physical quantity which is dependent on the temperature, and outputs an electrical signal in accordance with the detected physical quantity.

EXPLANATION OF REFERENCE NUMERALS 100 physical quantity sensor apparatus
101 physical quantity sensor
102 temperature sensor
103 Vcc voltage divider unit
104 computing unit
105 storage unit
106 input/output unit
111 first acquiring unit
112 second acquiring unit
113 first calculating unit
114 second calculating unit

What is claimed is:

1. A computer implemented output value correction method for a physical quantity sensor apparatus including a physical quantity sensor for detecting a physical quantity, other than temperature, which is dependent on temperature and outputting an electrical signal according to the detected physical quantity; and a temperature sensor for outputting an electrical signal corresponding to detected temperature, the method comprising:
   a generating step of generating at least three initial output values by the physical quantity sensor;
   a first acquiring step of respectively acquiring the at least three initial output values output by the physical quantity sensor, at at least three predetermined temperatures;
   a second acquiring step of respectively acquiring target output values for the physical quantity sensor previously set in accordance with the at least three initial output values;
   a first calculating step of calculating first characteristic values for correcting output characteristics of the physical quantity sensor changing non-linearly with respect to the detected physical quantity, based on the initial output values and the target output values; and
   a second calculating step of calculating second characteristic values for correcting the first characteristic values changing non-linearly with respect to the temperature detected by the temperature sensor, based on the at least three predetermined temperatures and the first characteristic values,
   wherein upon receiving the at least three initial output values, a computer performs the first acquiring step, the second acquiring step, the first calculating step and the second calculating step,
   in the first calculating step, a first characteristics formula indicating corrected output characteristics of the physical quantity sensor is calculated by approximating the initial output values and the target output values to a second-order or higher-order polynomial expression for each of the at least three predetermined temperatures,
   coefficients and constant terms of the first characteristics formula are set as the first characteristic values,
   in the second calculating step, a second characteristics formula indicating temperature dependence characteristics of the first characteristic values is calculated by approximating the at least three predetermined temperatures and the first characteristic values to a second-order or higher-order polynomial expression for each of the coefficients and constant terms of the first characteristics formula,
   coefficients and constant terms of the second characteristics formula are set as the second characteristic values,
   in the first acquiring step, signals from the physical quantity sensor, the temperature sensor and a voltage divider unit of the physical quantity sensor apparatus are retained in first to third latch circuits, and then memorized in a data storage unit after the second acquiring step, and
   in the second calculating step, actual signals from the physical quantity sensor, the temperature sensor and a voltage divider unit are obtained, and are calculated with reference to the signals stored in the data storage unit to thereby obtain corrected output values.

2. The computer implemented output value correction method for the physical quantity sensor apparatus according to claim 1, wherein a least-square method is used when approximating to the second-order or higher-order polynomial expression.

3. The computer implemented output value correction method for the physical quantity sensor apparatus according to claim 1, further comprising:
   a computing step of computing a corrected output value for the physical quantity sensor, based on an output value of the physical quantity sensor at a current time, and corrected first characteristic values corrected by using an output value of the temperature sensor at the current time and the second characteristic values.

4. The computer implemented output value correction method for the physical quantity sensor apparatus according to claim 3, wherein in the computing step, the corrected output value for the physical quantity sensor proportional to a power supply voltage is computed.

5. The computer implemented output value correction method for the physical quantity sensor apparatus according to claim 3, further comprising:
   a storing step for storing the second characteristic values in a storing device;
   wherein, in the computing step, the second characteristic values which have been read out from the storing device are used.

6. The computer implemented output value correction method for the physical quantity sensor apparatus according to claim 1, further comprising:
   a computing step of computing a corrected output value for the physical quantity sensor by inputting an output value of the physical quantity sensor at a current time, an output value of the temperature sensor at the current time, and the second characteristic values, into a computing device which constitutes the first characteristics formula and the second characteristics formula.

7. The computer implemented output value correction method for the physical quantity sensor apparatus according to claim 1, wherein the physical quantity sensor is a pressure sensor, an acceleration sensor, a gyro sensor, or a flow rate sensor.

8. A physical quantity sensor apparatus, comprising:
   a physical quantity sensor for detecting a physical quantity, other than temperature, which is dependent on temperature, and outputting an electrical signal according to the detected physical quantity;
   a temperature sensor for outputting an electrical signal corresponding to detected temperature;
   a first acquiring device for respectively acquiring at least three initial output values output by the physical quantity sensor at at least three predetermined temperatures;
   a second acquiring device for respectively acquiring target output values for the physical quantity sensor previously set in accordance with the at least three initial output values;
   a first calculating device for calculating first characteristic values for correcting output characteristics of the physical quantity sensor changing non-linearly with respect to the detected physical quantity, based on the initial output values and the target output values;
   a second calculating device for calculating second characteristic values for correcting the first characteristic values changing non-linearly with respect to the temperature detected by the temperature sensor, based on the at least three predetermined temperature and the first characteristic values; and a computer performing as the first acquiring device, the second acquiring device, the first calculating device and the second calculating device, wherein the first calculating device calculates a first characteristics formula indicating corrected output characteristics of the physical quantity sensor by approximating the initial output values and the target output values to a second-order or higher-order polynomial expression for each of the at least three predetermined temperatures, and sets coefficients and constant terms of the first characteristics formula as the first characteristic values, the second calculating device calculates a second characteristics formula indicating temperature dependence characteristics of the first characteristic values by approximating the at least three predetermined temperature and the first characteristic values to a second-order or higher-order polynomial expression for each of the coefficients and constant terms of the first characteristics formula, and sets coefficients and constant terms of the second characteristics formula as the second characteristic values, in the first calculating device, signals from the physical quantity sensor, the temperature sensor and a voltage divider unit of the physical quantity sensor apparatus are retained in first to third latch circuits, and then memorized in a data storage unit after being processed by the second calculating device, and in the second calculating device, actual signals from the physical quantity sensor, the temperature sensor and a voltage divider unit are obtained, and are calculated with reference to the signals stored in the data storage unit to thereby obtain corrected output values.

9. The physical quantity sensor apparatus according to claim 8, wherein a least-square method is used when approximating to the second-order or higher-order polynomial expression.

10. The physical quantity sensor apparatus according to claim 8, further comprising:

a computing device for computing a corrected output value for the physical quantity sensor, based on an output value of the physical quantity sensor at a current time, and the corrected first characteristic values which have been corrected by using an output value of the temperature sensor at the current time and the second characteristic values.

11. The physical quantity sensor apparatus according to claim 10, wherein the computing device computes a corrected output value for the physical quantity sensor proportional to a power supply voltage.

12. The physical quantity sensor apparatus according to claim 10, further comprising:

a storing device for storing the second characteristic values, wherein the computing device uses the second characteristic values which have been read out from the storing device.

13. The physical quantity sensor apparatus according to claim 8, further comprising:

a computing device forming the first characteristics formula and the second characteristics formula, wherein the computing device computes a corrected output value for the physical quantity sensor by receiving an output value of the physical quantity sensor at a current time, an output value of the temperature sensor at the current time, and the second characteristic values.

14. The physical quantity sensor apparatus according to claim 8, wherein the physical quantity sensor is a pressure sensor, an acceleration sensor, a gyro sensor, or a flow rate sensor.

15. An output value correction apparatus for receiving an output signal from a physical quantity sensor detecting a physical quantity, other than temperature, which is dependent on temperature and outputting an electrical signal in accordance with the detected physical quantity, and an output signal from a temperature sensor outputting an electrical signal corresponding to detected temperature, and correcting the output values of the physical quantity sensor, comprising:

a first acquiring device for respectively acquiring at least three initial output values output by the physical quantity sensor at at least three predetermined temperatures;

a second acquiring device for respectively acquiring target output values for the physical quantity sensor previously set in accordance with the at least three initial output values;

a first calculating device for calculating first characteristic values for correcting output characteristics of the physical quantity sensor changing non-linearly with respect to the detected physical quantity, based on the initial output values and the target output values; and a second calculating device for calculating second characteristic values for correcting the first characteristic values changing non-linearly with respect to the temperature detected by the temperature sensor, based on the at least three predetermined temperature and the first characteristic values; and a computer performing as the first acquiring device, the second acquiring device, the first calculating device and the second calculating device, wherein the first calculating device calculates a first characteristics formula indicating corrected output characteristics of the physical quantity sensor by approximating the initial output values and the target output values to a second-order or higher-order polynomial expression for each of the at least three predetermined temperatures, and sets coefficients and constant terms of the first characteristics formula as the first characteristic values, the second calculating device calculates a second characteristics formula indicating temperature dependence characteristics of the first characteristic values by approximating the at least three predetermined temperature and the first characteristic values to a second-order or higher-order polynomial expression for each of the coefficients and constant terms of the first characteristics formula, and sets coefficients and constant terms of the second characteristics formula as the second characteristic values, in the first calculating device, signals from the physical quantity sensor, the temperature sensor and a voltage divider unit of the physical quantity sensor apparatus are retained in first to third latch circuits, and then memorized in a data storage unit after being processed by the second calculating device, and in the second calculating device, actual signals from the physical quantity sensor, the temperature sensor and a voltage divider unit are obtained, and are calculated with reference to the signals stored in the data storage unit to thereby obtain corrected output values.

* * * * *